United States Patent [19]
Myers, Jr.

[11] 3,858,772
[45] Jan. 7, 1975

[54] HOPPER ASSEMBLY
[75] Inventor: Lawrence Archibald Myers, Jr., Franklin, Pa.
[73] Assignee: Conair, Inc., Franklin, Pa.
[22] Filed: June 26, 1972
[21] Appl. No.: 266,275

[52] U.S. Cl. ............................................. 222/460
[51] Int. Cl. ............................................. E04b 7/00
[58] Field of Search .............................. 220/12; 248/99–101; 222/105, 460, 203, 529, 561

[56] References Cited
UNITED STATES PATENTS
532,632   1/1895   Becker ............................... 222/203

2,720,341   10/1955   Stirn et al. ........................ 222/203 X
3,618,925   11/1971   Girolami .......................... 222/561 X Primary Examiner—Allen N. Knowles
Assistant Examiner—John P. Shannon
Attorney, Agent, or Firm—Howard E. Sandler

[57] ABSTRACT

A hopper assembly and more particularly an improved hopper assembly utilized in a vacuum loader system for transporting finely divided or granular material from a storage bin to a processing machine and wherein the hopper assembly is located intermediate the discharge end of a mixing chamber and the entrance throat of the processing machine.

8 Claims, 4 Drawing Figures

PATENTED JAN 7 1975
3,858,772
SHEET 1 OF 2
FIG. 1
FIG. 4
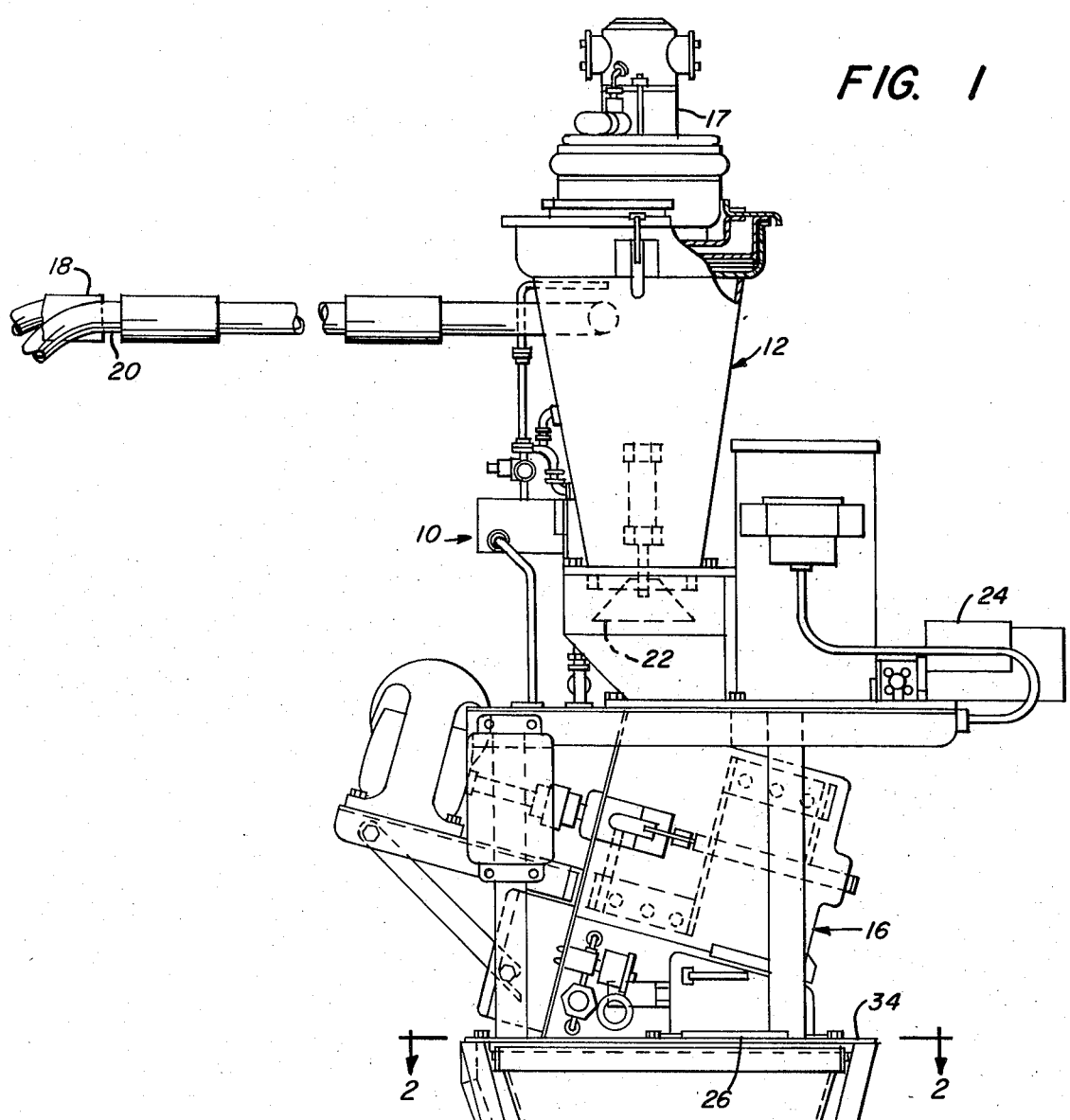
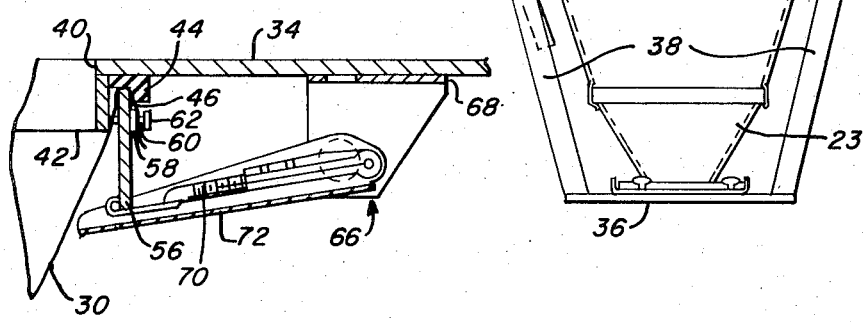

HOPPER ASSEMBLY

Material transporting devices and particularly some vacuum loader systems utilized for transporting finely divided or granular material such as virgin plastic and regrind from a storage bin to a processing machine mix the transported material with a coloring agent prior to feed into the processing machine. The mixing is often accomplished in a mixing chamber wherefrom the mixed material discharges into an enclosed rigid hopper which communicates with the material entrance throat of the plastic processing machine. Such transporting devices have operated adequately; however, inasmuch as color control is quite important in the plastic processing and fabrication industries it is mandatory that all material be removed from the discharge hopper prior to initiating a run of a different color. Such a requirement has necessitated frequent cleaning of the discharge hopper and during such cleaning the material transporting equipment upwardly of the hopper had to be removed to facilitate a thorough and complete cleaning.

Copending U.S. Pat. application Ser. No. 231,963, filed Mar. 6, 1972, entitled "Material Transporting Device" and assigned to the same assignee as is this invention discloses therein a relatively inexpensive and readily interchangeable flexible hopper member which, among other advantages disclosed in such application, greatly alleviates the above mentioned problem of cleaning the hopper assembly. The invention herein relates to an improvement over the flexible hopper assembly of a type initially disclosed in the above mentioned copending application by providing an improved apparatus and method for inserting, retaining and removing the flexible hopper member.

A further object and advantage of the present invention occurs in the utilization of a split discharge opening adjacent the lower discharge end of the hopper assembly. Such discharge opening assures more positive flow control while simultaneously providing a more efficient and trouble-free discharge mechanism.

These and other objects and advantages will become more readily apparent from a reading of the following description and drawings in which:

FIG. 1 is a partial side elevational view, partly schematic of a material transporting system which incorporates therein a hopper assembly constructed according to the principles of the present invention;

FIG. 4 is an enlarged schematic sectional view of a latch assembly taken on line 4—4 of FIG. 2;

Figure 2:
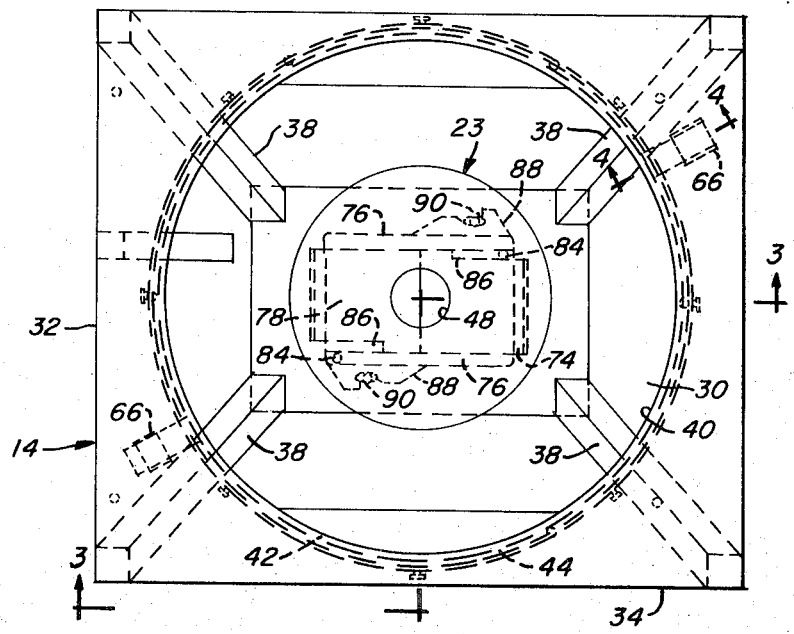
FIG. 2 is an enlarged plan view of the hopper assembly of the invention taken on line 2—2 of FIG. 1.
Figure 3:
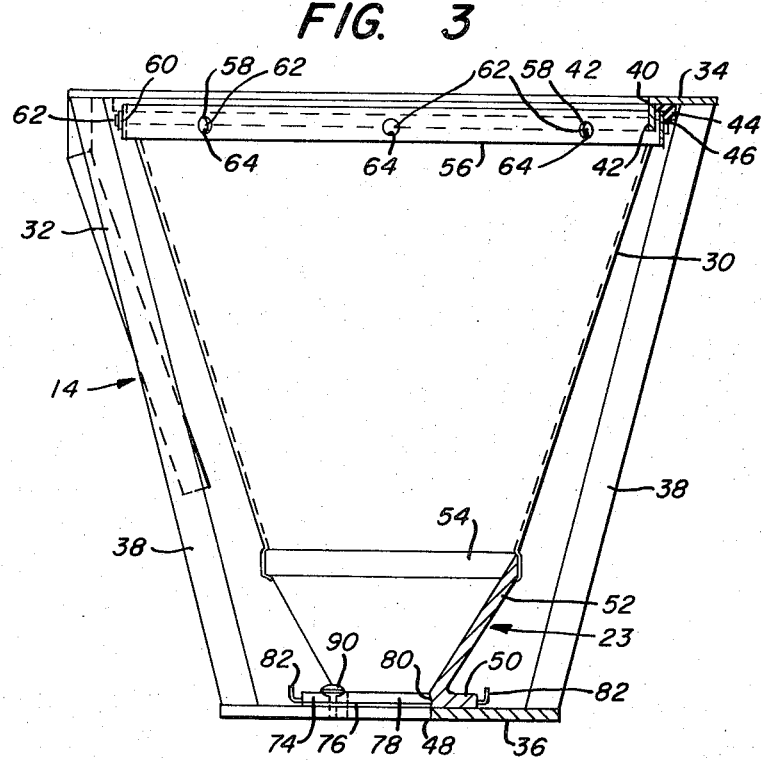
FIG. 3 is an elevational view, partially in section, of the hopper assembly taken on lines 3—3 of FIG. 2.

FIG. 1 illustrates a vacuum loader system 10 embodying the principles of the present invention and comprises upper and lower vertically spaced hopper assemblies 12 and 14, respectively, and a mixer assembly 16 located intermediate hopper assemblies 12 and 14. Loader system 10 is of a type for transporting finely divided or granular material from a storage bin to a processing machine and the particular system illustrated in FIG. 1 is used in transporting materials utilized in plastic molding processes from the respective storage bins thereof (not shown) to the plastic processing machine (not shown).

To transport materials to the plastic processing machine from the storage bin a vacuum motor 17 which is carried adjacent the upper end of hopper assembly 12 is energized thereby drawing material through conduits 18 and 20 and into hopper assembly 12 adjacent the upper end thereof. A plurality of conduits such as conduits 18 and 20 are provided such that proportional amounts of different materials can be drawn from independent sources for example proportional quantities of uncolored virgin plastic and regrind material may be selectively introduced into hopper assembly 12 simultaneously or sequentially. Subsequent to filling hopper assembly 12 with the desired quantities of raw materials a conical valve assembly 22 is energized thereby permitting the raw materials to fall by gravity from hopper assembly 12 into the mixer assembly 16. Valve assembly 22 is carried by hopper assembly 12 adjacent the lower end thereof and comprises a frusto conical upwardly and inwardly tapering member which is suitably dimensioned to close the exit throat of hopper 12 when desired.

A color feed assembly 24 is positioned adjacent mixer assembly 16. If the resultant processed plastic is to be colored then color feed assembly 24 is energized to feed a proper amount of colorant to the mixer assembly. The energization of feed assembly is substantially simultaneously with the introduction of the raw materials into mixer assembly 16. The mixing action of mixer assembly 16 is continuous during the operating cycle of the system thereby insuring a plastic material that is uniformly coated with dry color or completely interspersed with color concentrate.

When the mixing of the plastic material is complete a gate 26 adjacent the lower end of mixer assembly 16 is opened thereby allowing the mixed plastic material within assembly 16 to gravity fall into the lower hopper assembly 14 wherefrom the material eventually enters the plastic processing machine. A slide gate assembly 23 of this invention is provided adjacent the lower end of hopper assembly and is operable in a manner as hereinafter described to selectively open and close communication between the hopper assembly 14 and the plastic processing machine.

Inasmuch as the invention herein resides primarily in the construction and operation of the lower hopper assembly 14 and the balance of the vacuum loader system 10 upwardly of lower hopper assembly 14 is well known in the material transporting art (for example see U.S. Pat. Nos. 3,273,943; 3,320,639; 3,309,146; 3,635,377; and 3,431,026) further description of the portions of the system 10, other than assembly 14, will not be set forth except as required for the description of lower hopper assembly 14.

Lower hopper assembly 14 as shown includes a flexible hopper member 30 which is supported and carried by a hopper frame member 32. The hopper frame member 32 comprises a transversely extending upper frame plate 34 and a lower frame plate 36. Plate 36 is vertically spaced from plate 34 and extends in a plane generally parallel to the plane of extension of plate 34. Plates 34 and 36 are illustrated as having a generally rectangular configuration. The transverse extent of upper plate 34 is greater than the transverse extent of lower plate 36 along all peripheral edges thereof. Channels 38 extend between respective corners of plates 34 and 36 to complete the basic structural framework of hopper assembly 14 which is of the general configuration of the open frustrum of a trapizoidal pyramid thereby being extremely suited to support the generally frusto conical flexible hopper member 30 therein.

Upper frame plate 34 includes a circular hopper entrance opening 40 therein. An annular frame member 42 having the diameter thereof substantially equal to the diameter of opening 40 has the upper end thereof fixedly secured to plate 34 and extends downwardly therefrom. An annular gasket 44 having the inner diameter thereof substantially equal to the outer diameter of member 42 is suitably positioned in hopper assembly 14 such that the upper surface thereof engages the lower surface of frameplate 34 and the inner periphery thereof engages the outer periphery of member 42. Gasket 44 is made of any suitable deformable material such as an elastomer and, as shown, has a generally rectangular cross section.

Lower frame plate 36 includes a circular hopper exit opening 48 which is coaxial with entrance opening 40. As shown, slide gate assembly 23 is coaxial with opening 48 and is releasably supported by plate 36 upwardly adjacent opening 48. Slide gate assembly 23 comprises: a lower gate portion 50; an upwardly extending and outwardly tapering frusto conical portion 52; and a flange or rim portion 54 adjacent the upper end of portion 52 and extending radially outwardly therefrom.

Hopper member 30 is a flexible transparent member of vinyl, polypropylene or the like having a generally frusto conical configuration which is open at both ends thereof. In operation the upper larger diameter end of hopper member 30 is releasably carried by hopper assembly 14 adjacent the upper end thereof and the lower smaller diameter end thereof is releasably carried by 14 adjacent the lower end thereof.

The upper end of hopper member 30 is releasably retained in the operational position thereof by means of a holding ring 56. Ring 56 is of a generally annular configuration having a diameter intermediate the inner and outer diameter of gasket 44 and includes a plurality of circumferentially spaced radially extending studs or hopper retaining buttons 58 intermediate the upper and lower ends thereof. As shown each of the buttons 58 include a radially outwardly extending cylindrical stem portion 60 which has one end thereof rigidly secured to ring 56 and a disc portion 62 which is coaxial with stem portion 60 and rigidly secured thereto adjacent the other end thereof. A plurality of circumferentially spaced retaining openings 64 extend transversely through bag member 30 downwardly adjacent the upper end thereof. The circumferential spacing of the openings 64 correspond to the circumferential spacing of retaining buttons 58 and the diameter of openings 64 is slightly greater than the diameter of disc portions 62.

To assemble a hopper member 30 in the operational position thereof an upper end portion of member is inserted through holding ring 56 and thereafter lapped over the upper end of ring 56. The lapped portion of hopper member 30 is adjusted until openings 64 are aligned with respective retaining buttons 58 to enable disc portions 62 to be inserted through openings 64. With the hopper member 30 carried by ring 56 in a manner as hereinafter described, ring 56 is suitably releasably positioned within hopper assembly 14 in a manner as hereinafter described. Radial tension is then applied to the lower free end of hopper member 30 to allow for the snug reception of a lower end portion thereof over rim portion 54. Subsequent to the reception of the lower end of hopper member 30 over rim portion 54 an axial tensile force is applied to ring 56 which results in an upward movement of ring 56 until the upper end thereof is sealingly seated on gasket 44. As shown, when ring 56 moves a portion upwardly of gasket 44 deforms into a more or less granular groove configuration 46 for the seating of ring 56 therewith. The upward movement of ring 56 is sufficient to take up any slack in the hopper member 30 and hence a reaction force transferred through the skin of the hopper member 30 results in a tight sealing relationship being obtained between rim portion and the encompassing lower portion of hopper member 30. Hence, when hopper member 30 is operationally positioned in a manner as described hereinabove the body thereof is taut and essentially wrinkle free and the upper and lower ends thereof are sealed from communication other than communication with the hopper entrance opening 40 and the hopper exit opening 48, respectively.

Ring 56 is releasably positioned within hopper assembly 14 by means of any suitable positioning means, for example; a pair of latch assemblies 66. As best seen in FIGS. 2 and 4, latch assemblies 66 are of the under the center toggle type and each comprises: a base portion 68 rigidly carried on the underside of upper frame plate 34 radially outwardly adjacent entrance opening 40; and a drawbar and operating lever 70 and 72, respectively, which are pivotally carried by base portion 68 and, as seen in FIG. 4, extend radially inwardly therefrom. For a full and complete description of the apparatus and operation of a latch assembly such as latch assemblies 66 is shown and illustrated in U.S. Pat. No. 3,127,205.

To assemble ring 56, the drawbar 70 is released in the usual manner by pulling operating lever 72 downwardly thereby resulting in drawbar 70 pivoting downwardly about the respective pivot axis thereof. Ring 56 is then hung from the diametrically opposed drawbars 70. Subsequent to the hanging of ring 56 from drawbars 70 and the fitting of the lower end portion of the flexible hopper member 30 over the rim portion 54, the operating lever 72 is closed to the position illustrated in FIG. 4. The closing of operating lever 72 results in the upward movement of retaining member thereby seating ring 56 in groove 46 and tensioning hopper member 30 as hereinbefore described. To remove the hopper member 30, latch assemblies 66 are easily opened thereby relieving the top and bottom seals of hopper member 30 and making it a simple task to remove the hopper member 30.

The discharge of material from hopper assembly 14 is controlled by gate portion 50 of slide gate assembly 23. Gate portion 50 comprises: a generally rectangular base plate 74 being releasably supported on lower frame plate 36 and having the lowermost surface thereof in engagement with the uppermost surface of plate 36; a pair of elongated guide bars 76 each of which are carried by base plate 74 adjacent a long edge thereof and which extend in the direction of such edge; and a pair of slide plates 78 which are positioned intermediate bars 76. Base plate 74 includes a circular opening 80 therethrough of a diameter substantially equal to the diameter of opening 48 and when base plate 74 is in the operational position thereof, opening 80 is coaxially aligned with opening 48. Slide plates 78 are slidable with the assist of end handles 82 in the longitudinal direction of bars 76 and in a horizontal plane to selectively open and close communication between hopper member 30 and the hopper exit opening 48. It is important to note that slide plates 78 open and close with respect to a centerline of exit opening 48 thereby preventing a build-up of material adjacent one end of the hopper gate assembly as has often occurred with prior gate assemblies which utilized a single slide plate. Furthermore, the dual gate arrangement of the present invention permits more positive control of the discharge of material from the hopper. Suitable means are provided to prevent slide plates 78 from being inadvertently pulled free of slide gate assembly; for example, a pair of diagonally-spaced retaining pins 84 extend upwardly from base plate 74 and cooperate with respective side slots 86 of slide plates 78.

Slide gate assembly 23 is releasably carried by lower frame plate 36 in a manner such that the entire assembly 23 is readily removable from plate 36. Means to provide for such releasability are shown as a pair of diagonally-spaced lug portions 88 which extend horizontally outwardly from respective sides of base plate 74. Lug portions 88 are provided with a cam surface and slot arrangement which cooperate with thumb screws 90 in a manner similar to a "bayonet lock" to provide for the hereinabove mentioned releasable retention. Thumb screws 90 are threadably received in base plate 74 and extend upwardly therefrom.

Inasmuch as the invention herein resides in the broad teachings of an improved method and apparatus and method for inserting, retaining and removing the flexible hopper member and in an improved discharge opening adjacent the lower end of the hopper assembly various modifications can be made to the preferred embodiment as described hereinabove without departing from the scope of the invention, for example: an annular compression strap can be positioned to encircle the rim portion 54 and the lower end portion of hopper member 30 to aid in maintaining the peripheral seal thereof; means other than latch assemblies 66 can be utilized in tensioning hopper member 30; suitable clips can be utilized in place of retaining buttons 58 to secure the upper end portion of hopper member 30 to the holding ring 56; gasket 44 can be formed with a circumferential groove therein; and the like. Furthermore, various modifications can be made in the method described hereinabove without departing from the scope of the invention such as first inserting retaining buttons 58 through respectively aligned openings 64 and thereafter pulling the small end of the hopper member through groove 56.

What is claimed is:

1. A method of forming an elongated pliant hopper member within a vertical supporting device having vertically spaced transversely extending hopper end supporting means with each of said supporting means being stationary with respect to each other comprising the steps of: releasably securing said hopper member within said supporting device intermediate said supporting means in a first position in a manner such that one end thereof is supported by and is in direct communication with one of said supporting means and the other end of said hopper member is supported by the other of said supporting means; subsequent to said securing applying a tensioning force to said hopper member and moving said other end of said hopper member toward said other of said supporting means to releasably retain said hopper member in a second position; and the sidewall of said hopper member is respectively slack in said first position and taut in said second position.

2. A hopper assembly comprising: a vertically extending supporting device having vertically spaced transversely extending hopper end supporting means; said supporting means being stationary with respect to each other; an elongated pliant hopper member releasably supported with respect to said device; other means adapted to releasably support both ends of said hopper member within said supporting device in a first and second mode; said other means having a portion thereof being operative to support one end of said hopper member in said first and second mode and to move said one end vertically towards one of said support means during the transition between said first and second mode; the sidewall of said hopper member in said first mode being slack; and the sidewall of said hopper member in said second mode being taut.

3. A hopper assembly as specified in claim 2 wherein said hopper member is of an inverted frusto conical configuration.

4. A hopper assembly as specified in claim 2 wherein said other means are operative to apply a tensioning force when said hopper member is in said second mode.

5. A hopper assembly as specified in claim 4 wherein said other means are operative to apply such tensioning force adjacent said one end and the other of said supporting means includes a portion which is cooperable with the other end of said hopper member to establish a positive friction seal between said portion of said other of said supporting assemblies and said other end at least when such tensioning force is applied.

6. A hopper assembly as specified in claim 2 additionally including discharge means carried by said supporting device adjacent the lower end thereof to selectively open and close the lower discharge end of said hopper assembly.

7. A hopper assembly as specified in claim 6 wherein said discharge means comprises a plurality of closure elements selectively movable transversely of the longitudinal extent of said hopper member with said elements mating intermediate the periphery of the discharge opening of said discharge end to effect the closing of said discharge end of said hopper assembly.

8. A transporting assembly for granular material comprising: a vertically extending supporting device having vertically spaced transversely extending hopper end supporting means; said supporting means being stationary with respect to each other; a loading device supported by the upper supporting means and having a material discharge opening; an elongated pliant hopper member in communication with said discharge opening for receiving material from said loading device and extending downwardly therefrom; other means adapted to releasably support both ends of said hopper member within said supporting device in a first and second mode; said other means having a portion thereof being operative to support one end of said hopper member in said first and second mode and to move said one end towards one of said support means during the transition between said first and second mode; the sidewall of said hopper member in said first mode being slack; and the sidewall of said hopper member in said second mode being taut.

* * * * *